United States Patent Office 3,274,173
Patented Sept. 20, 1966

3,274,173
FLUORO, NITROBENZYL SULFONYL AMIDE COLORANTS
Joseph W. Dehn, Jr., Great Neck, N.Y., Edward Gancher, Clifton, N.J., and Harold J. Kuhefuss and Paul Resnick, Brooklyn, N.Y., assignors to Interchemical Corporation, New York, N.Y., a corporation of Ohio
No Drawing. Filed Oct. 31, 1963, Ser. No. 320,532
6 Claims. (Cl. 260—205)

This invention relates to reactive colorants containing fluoronitrophenyl groups.

The colorants of this invention may be made, for instance, by reacting o-fluoronitrobenzene with chlorosulfonic acid at 130° to 135° C. to form 4-fluoro-3-nitrobenzene sulfonyl chloride and then reacting this with p-aminoazobenzene, the final product being 4-fluoro-3-nitrobenzene sulfonyl (4'-phenylazophenyl)-amide. A similar procedure using 1-aminoanthraquinone instead of p-aminoazobenzene yields 4-fluoro-3-nitrobenzene sulfonyl-(1'-anthraquinonyl)-amide.

The water-soluble sodium salts may be made, for example, by the interaction of 4-fluoro-3-nitrobenzene sulfonyl chloride with an aqueous solution of 4-aminoazobenzene-4'-sulfonic acid containing sodium bicarbonate.

The corresponding compounds having the reactive group omitted may be prepared, to give an illustrative example, by reacting 3-nitrobenzene sulfonyl chloride with p-aminoazobenzene.

Each reactive colorant was evaluated in comparison with the analogous compound without the reactive group. Corresponding water-soluble and water-insoluble colorants of analogous chemical structure were synthesized and evaluated to compare the relative performance of the dyestuff and the pigment forms of the compounds. The water-insoluble reactive colorants (pigments) were tested in a textile printing system having no binder present.

In a textile print developed with a base, using as colorant 4-fluoro-3-nitrobenzene sulfonyl (4'-phenylazophenyl)-amide, there was attained much better wash fastness and drycleaning fastness than was the case with the analog, 3 - nitrobenzene sulfonyl - (4' - phenylazophenyl) - amide, which lacks the reactive fluorine atom but is otherwise structurally the same. Prints made with 4-fluoro-3-nitrobenzene sulfonyl-(1'-anthraquinonyl)-amide showed better fastness properties than similar prints made with the analogous fluorine-free compound.

Each of the reactive colorant prints lost some color on the first drycleaning, but when the test was repeated ten times in succession on each test piece, no more color was lost from the reactive colorant prints. The basic developed prints showed better drycleaning fastness than undeveloped control prints of the same pigment in the case of the compounds containing reactive functions, whereas no change was shown where the compounds lacked the reactive group.

Similarly water-soluble modifications of the compounds (sodium sulfonates) were compared with the corresponding compounds not having the reactive groups. Dyeings made with the latter were much less washfast than dyeings made with the reactive type compounds. For example 4-fluoro-3-nitrobenzene sulfonyl-(4'-(4''-sulfo) phenylazophenyl)-amide sodium salt dyed cotton under warm (65°–70° C.) alkaline conditions and produced yellow dyeings with good wash and drycleaning fastness, but 4-aminoazobenzene-4'-sulfonic acid dyed cotton a fugitive yellow which washed off with only a hot water rinse. The reactive water-soluble forms (sulfonates) were clearly superior to the reactive pigment forms, as shown by the evaluation tests. However, the insoluble forms displayed much better results when used as disperse dyes rather than as pigments. The water-insoluble dyes were dispersed with surfactants and nylon fabric was dyed with the dispersions. In the alkaline developed dispersed dyeing of nylon, for instance, 4-fluoro-3-nitrobenzene sulfonyl-(4'-phenylazophenyl)-amide gave much improved wash fastness compared to the closely-related but unreactive 3-nitrobenzene sulfonyl-(4'-phenylazophenyl)-amide. Neither compound showed any color loss or staining in the drycleaning tests although 11 consecutive drycleaning tests were made on each dyed specimen.

The reactive colorants of this invention are represented by the structural formula

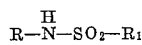

where R represents a member selected from the group consisting of

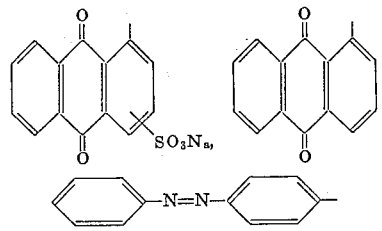

and

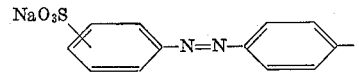

and $R_1$ is a member selected from the group consisting of

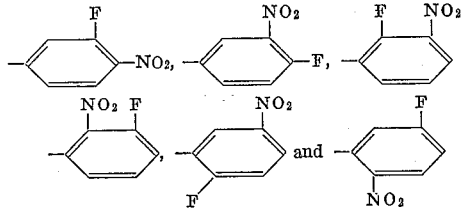

The position of the sodium sulfonate group is not critical; it may replace any of the hydrogens on the "R" aromatic rings.

4-FLUORO-3-NITROBENZENE SULFONYL CHLORIDE

A solution of 14.10 g. (.100 mole) of 2-fluoro-1-nitrobenzene in 116.5 g. (65 ml.) (1.00 mole) of chlorosulfonic acid was heated gradually in one hour to 130° C. The batch was stirred 2 hours at 130 to 135° C. and then cooled and added to a water and ice mixture dropwise. The oily precipitate was extracted with 500 ml. of benzene. The separated benzene solution was extracted with 2 500-ml. portions of ice water until neutral to litmus. Then it was dried over anhydrous sodium sulfate, filtered, and the benzene was distilled off. The product was purified by vacuum distillation using a Vigreux column. The 4-fluoro-3-nitrobenzene sulfonyl chloride was obtained as a light yellow liquid having a boiling point of 124 to 126° C. at a pressure of 0.3 mm. of mercury.

*Example 1*

4-FLUORO-3-NITROBENZENE SULFONYL (4'-PHENYLAZOPHENYL)-AMIDE

To 100 ml. of a 5.3% aqueous solution of sodium carbonate (.050 mole) cooled to 0° C. there was added, at the same temperature, a solution of 9.85 g. (.050 mole) of p-aminoazobenzene in 130 ml. of methylene chloride. A solution of 12.02 g. (.050 mole) of fluoro-3-nitrobenzene sulfonyl chloride in 25 ml. of methylene chloride was added dropwise over a period of 55 minutes at 2 to 4°

C. The batch was stirred 2½ hours at a temperature below 4° C. The material was then allowed to reach room temperature and stirring continued 16 hours. The phases were separated and the aqueous phase (pH=8) was extracted with 30 g. of methylene chloride. The combined methylene chloride solutions were extracted with 3 100-ml. portions of water. Evaporation of the methylene chloride gave 14.81 g. of a red solid, which was taken up with 1500 ml. of methylene chloride and filtered. 4.15 g. of material remained on the filter. The solution was chromatographed on a large column of alumina where unreacted aminoazobenzene was removed with methylene chloride. The product was eluted with methyl alcohol and recrystallized from a benzene-ether mixture. The orange-yellow crystalline solid thus purified had a melting point of 140 to 145° C.

*Example 2*

4-FLUORO-3-NITROBENZENE SULFONYL-(1′-ANTHRAQUINONYL)-AMIDE

A solution of 12.00 g. (.05 mole) of 4-fluoro-3-nitrobenzene sulfonyl chloride in 25 ml. of methylene chloride was slowly added to a mixture of 11.15 g. (.05 mole) of 1-aminoanthraquinone, 3.45 g. (.05 mole) of pyridine, and 2060 ml. of methylene chloride, all at a temperature of 2° to 4° C. The batch was stirred 1½ hours at 0° C. and then 17 hours at room temperature and then extracted with water and the solvent was evaporated off. the residue was taken up with water, filtered, and dried. The product was purified chromatographically by running a solution of 5.20 g. of crude in 220 ml. of dimethyl formamide into a large column of alumina. Elution with dimethyl formamide removed unreacted 1-aminoanthraquinone, which was isolated by diluting the red solution with water and collecting the precipitate formed. The column was then eluted with methyl alcohol until the orange band was removed. Evaporation of solvent from this eluate and recrystallization of the resulting solid from aqueous acetone yielded brownish-yellow crystals melting at 200.5° to 202° C.

*Example 3*

4-FLUORO-3-NITROBENZENE SULFONYL-(4′-(4″-SULFO)-PHENYLAZOPHENYL)-AMIDE SODIUM SALT

A solution of 19.8 g. of 70% 4-aminoazobenzene-4′-sulfonic acid (.05 mole) in 790 ml. of water was treated with 8.4 g. (.10 mole) of sodium bicarbonate. The solution was cooled to 0° C. and another solution containing 14.4 g. (.06 mole) of 4-fluoro-3-nitrobenzene sulfonyl chloride dissolved in 25 ml. of acetone was added gradually at 3° to 4° C. over a period of 20 minutes. Stirring at 0° C. was continued for 45 minutes and then overnight at room temperature. The precipitate was filtered, washed with 250 ml. of water, and dried in an oven. The yield of orange solid corresponded to 73.9% of theory. When recrystallized from water, it melted at about 285° C. with decomposition.

In order to have the analogous compound without the reactive group, 3-nitrobenzene sulfonyl chloride was condensed with p-aminoazobenzene to obtain 3-nitrobenzene sulfonyl-(4′-phenylazophenyl)-amide. The reaction was carried out in the cold using a 2-phase methylene chloride and water system. The products were purified by chromatography in a column of alumina followed by recrystallization.

For printing tests the colorants were incorporated in printing pastes identical with several commercially available printing pastes from which, however, the binders had been omitted and their pigments replaced by the pigments of this invention. The prints made therefrom were can dried and then treated with 2.5% sodium carbonate solution, the excess being removed with a wringer. The material was then can dried and cured at 250° F. for 5 minutes. Both cured and uncured prints were subjected to fastness tests, namely the A.A.T.C.C. wash tests #2 and 3A and the perchloroethylene drycleaning test. A series of printing tests were similarly made, but without omission of the binder. The results paralleled those of the binderless system.

The soluble dyestuffs were evaluated by dissolving in water, entering cotton cloth, and stirring 10 minutes at about room temperature. 3% of sodium chloride (dyebath basis) was added in 2 portions over a period of 10 minutes. Subsequently 0.2% of sodium carbonate was similarly added. Dyeing was continued 60 minutes more at about room temperature, the material finally being rinsed and dried. This is the procedure recommended for the commercially available "Procion" reactive dyes containing a 4,6-dichloro-1,3,5-triazinyl-2-group.

Dyeings were also made in hot dyebaths. The procedure was the same as the above-described room temperature dyeings except that the temperature was at least 65° C. throughout, 5% of sodium chloride was used for a 0.5% dyeing and 7.5% for a 2% dyeing, and 1.5% trisodium phosphate was used instead of sodium carbonate.

The compounds were evaluated as dispersed dyes by mixing them with a small amount of 5% sodium lauryl sulfate solution and then diluting with warm water. Two pieces of nylon cloth were added and dyed in the bath one hour at 85° C. The cloth was removed from the bath and rinsed. One piece was put aside as a control specimen, the other was treated in a bath of 0.2% sodium carbonate solution containing 0.1% sodium lauryl sulfate at 85° C. for ½ hour. The cloth was removed, rinsed with cold water followed by a rinsing with water near its boiling point. It was then boiled 10 minutes in a 0.2% solution of "Lissapol ND" and rinsed with nearly boiling water, rinsed with cold water, and dried.

"Lissapol ND" is a detergent consisting of a condensate of nonylphenyl ethylene oxide with a sulfated fatty alcohol.

What is claimed is

1. A reactive colorant having the structural formula $$\text{R}-\overset{\text{H}}{\text{N}}-\text{SO}_2-\text{R}_1$$

where R is a member selected from the group consisting of

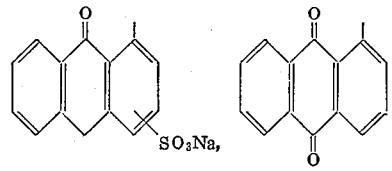

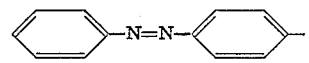

and

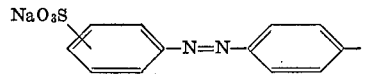

and $R_1$ is a member selected from the group consisting of

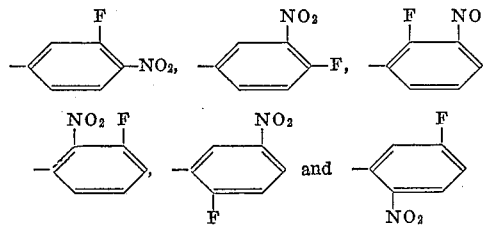

2. A water-insoluble reactive colorant having the structural formula

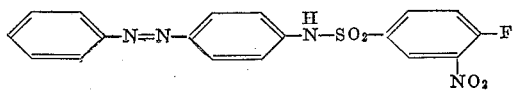

3. A water-insoluble reactive colorant having the structural formula
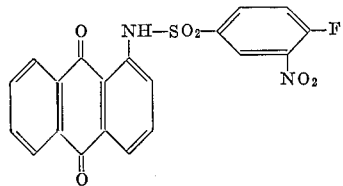
4. A water-soluble reactive colorant having the structural formula
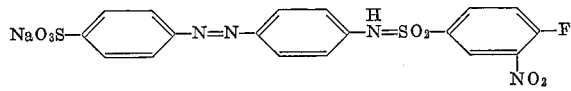
5. A water-soluble reactive colorant having the structural formula
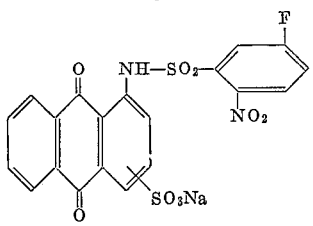
6. A water-soluble reactive colorant having the structural formula
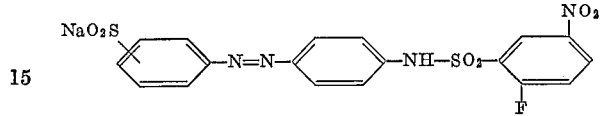
No references cited
CHARLES B. PARKER, *Primary Examiner.*
FLOYD D. HIGEL, *Assistant Examiner.*